United States Patent
Boddakayala et al.

(10) Patent No.: US 9,543,556 B2
(45) Date of Patent: Jan. 10, 2017

(54) BATTERY ASSEMBLY

(71) Applicant: Ford Global Technologies, LLC, Dearborn, MI (US)

(72) Inventors: Bhaskara Boddakayala, Canton, MI (US); Thomas M. Gunther, Canton, MI (US); Rajaram Subramanian, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 378 days.

(21) Appl. No.: 14/057,273

(22) Filed: Oct. 18, 2013

(65) Prior Publication Data

US 2015/0111074 A1 Apr. 23, 2015

(51) Int. Cl.
| | |
|---|---|
| *H01M 2/10* | (2006.01) |
| *H01M 2/02* | (2006.01) |
| *H01M 10/625* | (2014.01) |
| *H01M 10/6563* | (2014.01) |
| *H01M 10/647* | (2014.01) |
| *H01M 10/613* | (2014.01) |
| H01M 10/6567 | (2014.01) |

(52) U.S. Cl.
CPC ......... *H01M 2/1077* (2013.01); *H01M 10/613* (2015.04); *H01M 10/625* (2015.04); *H01M 10/647* (2015.04); *H01M 10/6563* (2015.04); *H01M 10/6567* (2015.04); *Y10T 29/49108* (2015.01)

(58) Field of Classification Search
CPC .. H01M 2/1077; H01M 2/202; H01M 10/625; H01M 10/6563; H01M 10/647; H01M 10/613; H01M 10/6567
See application file for complete search history.

(56) References Cited

U.S. PATENT DOCUMENTS

| | | | |
|---|---|---|---|
| 4,317,497 A | 3/1982 | Alt et al. | |
| 6,632,560 B1 | 10/2003 | Zhou et al. | |
| 7,548,429 B2 | 6/2009 | Miller | |
| 7,919,203 B2 | 4/2011 | Shibuya et al. | |
| 7,951,483 B2 | 5/2011 | Onuki et al. | |
| 2005/0218136 A1* | 10/2005 | Kotani | B60L 3/0046 219/202 |
| 2006/0172187 A1* | 8/2006 | Ambrosio | H01M 2/1077 429/120 |
| 2007/0087266 A1* | 4/2007 | Bourke | H01M 2/0242 429/159 |
| 2010/0015512 A1* | 1/2010 | Inoue | H01M 2/206 429/99 |
| 2012/0040237 A1 | 2/2012 | Hamada et al. | |
| 2013/0157098 A1 | 6/2013 | McLaughlin et al. | |

* cited by examiner

*Primary Examiner* — Kenneth Douyette
(74) *Attorney, Agent, or Firm* — Brooks Kushman P.C.; David B. Kelley

(57) ABSTRACT

A battery stack is provided having lower and upper battery tiers each formed of at least two battery cell arrays. A pair of brackets are provided for connecting the lower arrays along a top surface of the lower tier and connecting the upper arrays to a bottom surface of the upper tier. The lower and upper battery tiers are secured together by the brackets without hardware mounted to an exterior surface of the stack.

13 Claims, 5 Drawing Sheets

BATTERY ASSEMBLY

TECHNICAL FIELD

The present disclosure relates to a traction battery system for a vehicle.

BACKGROUND

A traction battery for an electric vehicle, or hybrid-electric may include many cells electrically connected. To attain a battery of a sufficiently high voltage, cells are electrically connected serially. Groups of several cells can be coupled in arrays then stacked in parallel. And, although cell groups are physically arranged in a parallel fashion, they may be electrically coupled either in series or in parallel. Groups of individual cells within can be called a stack or a brick. A plurality of arrays are arranged in an stack and electrically connected to provide the desired voltage and current characteristics for the particular application. Such connected plurality of battery cell arrays forms a battery. An example of a battery and array is disclosed in U.S. Pat. No. 8,323,818.

SUMMARY

According to one or more embodiments of the present disclosure a battery stack is provided. The battery stack includes lower and upper battery tiers each formed of at least two battery cell arrays. A pair of brackets is provided. One bracket connects the lower arrays along a top surface of the lower tier. The other bracket connects the upper arrays to a bottom surface of the upper tier. The lower and upper battery tiers are secured together by the brackets without hardware mounted to an exterior surface of the stack.

In another embodiment, each of the brackets has a same mounting footprint. The footprints are aligned to secure the lower and upper tiers together and allow airflow between the lower and upper battery tiers.

In another embodiment, one of the brackets is mounted to the lower battery tier to define a lower bracket having a top middle bracket and a pair of side brackets. The top middle bracket connects the at least two lower battery arrays. The side brackets are spaced apart from the middle bracket and mounted to side regions on the lower battery tiers.

In another embodiment, the top middle bracket, the right side bracket and the left side bracket are spaced apart to define lower openings. The upper bracket includes a plurality of apertures formed therethrough. The lower openings and plurality of apertures allow airflow between the lower and upper battery tiers.

In another embodiment, the lower bracket is fastened to a top surface of the lower battery tier and the upper bracket is fastened to a bottom surface of the upper battery tier. The mounting footprint of the lower bracket and upper bracket is the same. Each mounting footprint includes a plurality of connection locations that align to connect the lower and upper battery tiers.

In another embodiment, the battery stack also includes a plurality of array frames each housing one of the battery arrays. Each of the array frames includes a pair of top rails and a pair of bottom rails. The top and bottom rails are connected by a pair of opposing end plates.

In another embodiment, the battery stack also includes a plurality of fasteners. At least one fastener extends only through the connection locations on the upper bracket and the lower bracket to connect the upper battery tier to the lower battery tier and does not extend through any of the array frames.

In another embodiment, the lower arrays are connected by the top middle bracket along adjacent top rails of the array frames and the upper arrays are connected by the tray along adjacent bottom rails of the array frames.

In another embodiment, each of the lower array frames includes at least one locating feature and each of the upper array frames includes at least one locating member that cooperates with the locating feature of a corresponding lower array frame to align the upper and lower battery tiers.

In another embodiment, the lower battery arrays are connected by the middle bracket along adjacent top rails of the array frames.

In another embodiment, wherein the upper battery arrays are connected by the tray along adjacent bottom rails of the array frames.

In another embodiment, an access opening is defined in the upper battery tier such that a fastener is accessible through the access opening to fasten the upper and lower brackets.

According to one or more other embodiments of the present disclosure, a battery stack is provided. A lower battery tier has at least two lower arrays of battery cells connected together. A top middle bracket connects the two arrays and mounted to a top surface of the lower tier. A pair of side brackets is mounted along opposite side regions of the lower tier on the top surface of the lower tier. An upper battery tier has at least two upper arrays of battery cells connected together. A bottom tray connects the two upper arrays and is mounted to a bottom surface of the upper tier. The bottom tray is aligned and fastened together with the top middle bracket and the pair of side brackets when the upper battery tier is mounted to the lower battery tier, thereby securing and aligning the lower and upper tiers together. The brackets and bottom tray allow airflow between the lower and upper battery arrays when the lower and upper battery tiers are secured together.

According to one or more other embodiments of the present disclosure, method of assembling battery arrays is provided. A pair of lower arrays of battery cells are positioned adjacent each other. A lower bracket is connected to the pair of lower arrays to form a lower battery tier. A pair of upper arrays of battery cells is positioned adjacent each other. A bracket is connected to the pair of upper arrays to form an upper battery tier. The upper battery tier is aligned with the lower battery tier. The upper bracket is aligned to the lower bracket through an access opening formed in the upper battery tier. A mounting footprint of the lower and upper brackets is the same and aligns to secure the upper battery tier to the lower battery tier. The lower and upper brackets allow an airflow between the lower and upper battery arrays.

DETAILED DESCRIPTION

Figure 1:
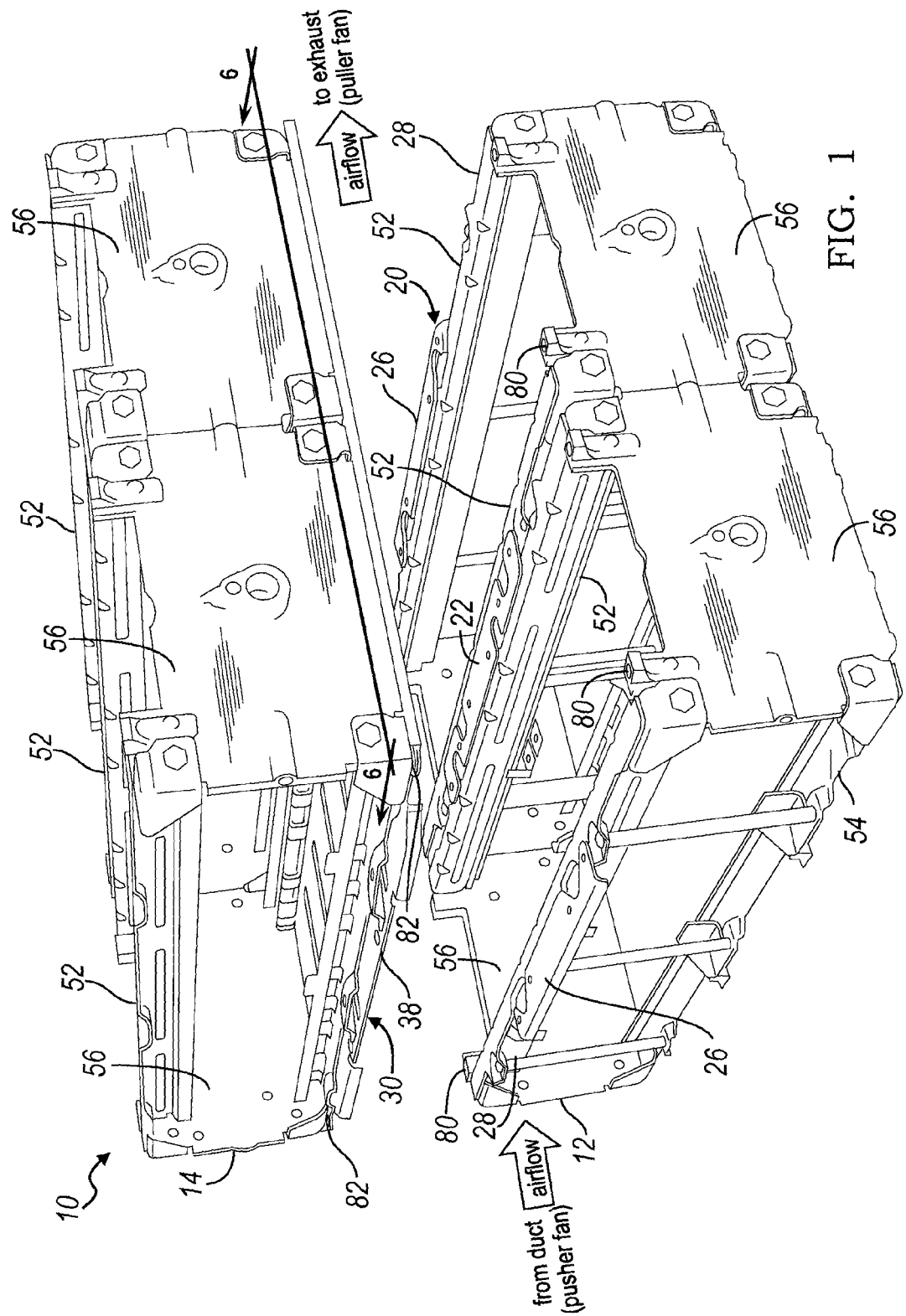
FIG. 1 illustrates an exploded view of a portion of a battery stack according to one embodiment of the present disclosure.
Figure 2:
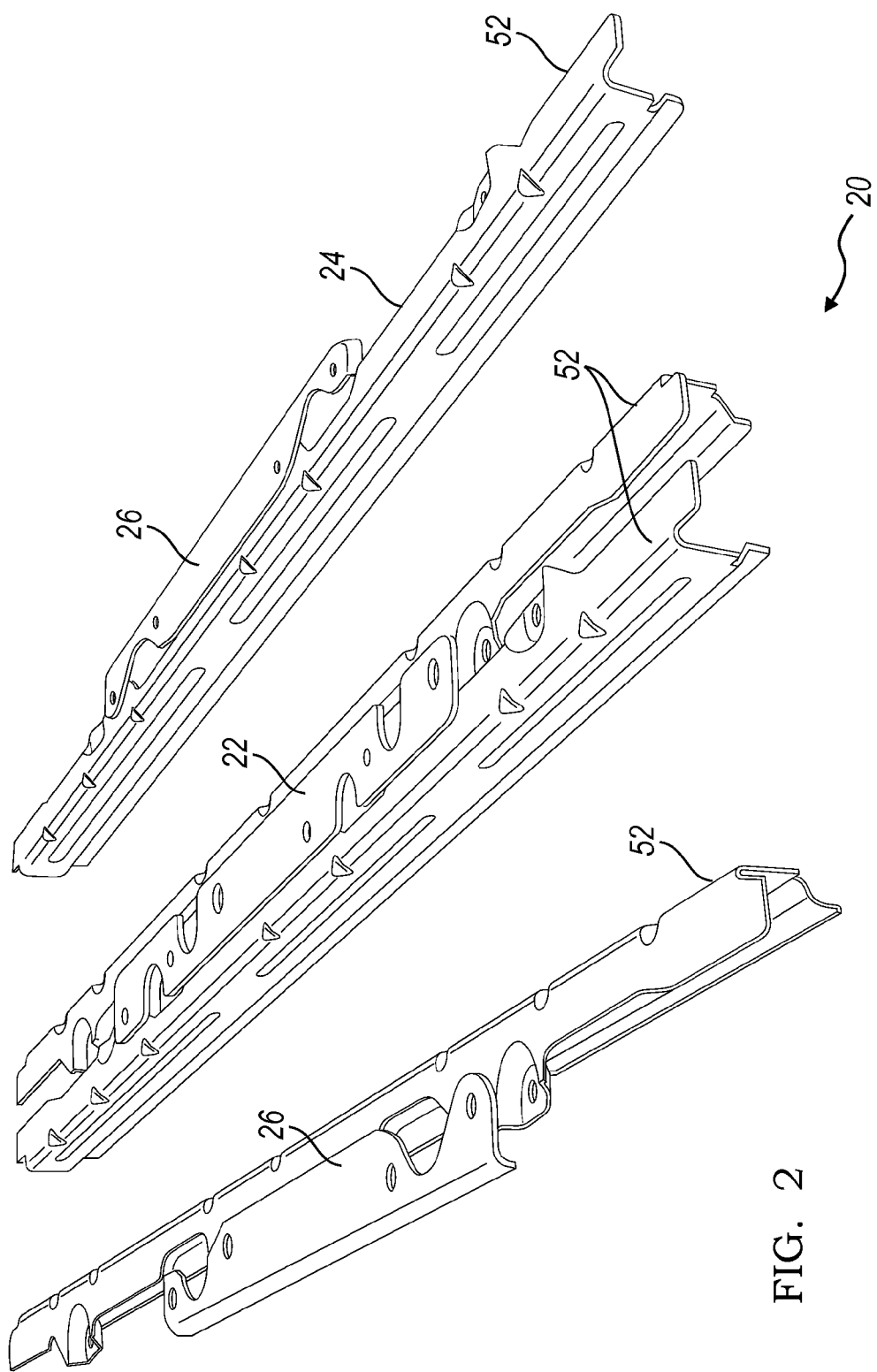
FIG. 2 illustrates a top view of a portion of the battery stack of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A battery for a hybrid electric vehicle may include many cells electrically connected serially in order to provide a sufficiently high voltage. Groups of several cells can be coupled longitudinally in arrays and then stacked with groups arranged in parallel compartments. A connected plurality of cell arrays forms a battery stack.

Vehicles which utilize a high-voltage (HV) battery may include an energy system having a battery pack with components such as one or more battery modules with battery cells, a body electrical control module (BECM), and a DC/DC converter module with a DC/DC converter unit. The battery cells may provide energy to operate a vehicle drive motor and other vehicle systems. The battery pack may be positioned at several different locations including below a front seat, a rear seat, or a location behind the rear seat of the vehicle. Two battery cell arrays may be in electrical communication with the BECM, DC/DC converter unit and other vehicle components.

The BECM may receive input signals from various control systems, process information included in the input signals and generate appropriate control signals in response thereto. These control signals may activate and/or deactivate the various components. The DC/DC converter unit may convert high voltage from the battery cells into low voltage for use by the components and systems.

Each battery array may include a plurality of battery cells. The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements described further herein. The battery cells may be heated and/or cooled with a thermal management system. Examples of thermal management systems may include air cooling systems, liquid cooling systems and a combination of air and liquid systems.

Air cooling systems may use one or more blowers and ducts to distribute air across, for example, the components of the battery module and DC/DC converter module to remove heat generated during vehicle operations. These operations may include charging and discharging the battery cells as well as removing the heat generated during voltage conversion in the DC/DC converter unit. Vehicle components in the environment surrounding the battery pack may be utilized to assist in managing the battery pack's thermal conditions.

Referring to FIG. 1, a battery stack 10 is illustrated. The battery stack 10 includes a lower battery tier 12 having at least two lower arrays 16 of battery cells connected together. The battery stack 10 also includes an upper battery tier 14 having at least two upper arrays 18 of battery cells connected together. The arrays of battery cells 16, 18 are shown and discussed further in FIGS. 3-5.

In order to secure the upper tier 14 to the lower tier 12, a lower tier attachment 20 and an upper tier attachment 30 are provided.

The attachment scheme includes the lower tier attachment 20 having a top middle bracket 22 connecting the two arrays and mounted to a top surface 24 of the lower tier 12. The lower tier attachment 20 also includes side brackets 26 mounted on the top surface 24 at opposite sides 28 of the lower tier 12. As shown, the lower tier attachment 20 includes one top middle bracket 22 at least two side brackets 26. However, if the lower battery tier 12 included a different number of lower battery arrays 16, additional middle brackets 22 may be provided.

The upper tier attachment 30 includes a bottom tray 32 connecting the two upper arrays 18 and mounted to a bottom surface 34 of the upper tier 14.

The lower tier attachment 20 and upper tier attachment 30 are aligned and fastened together when the upper battery tier 14 is mounted to the lower battery tier 12. The upper tier attachment 30 and lower tier attachment 20 align the lower tier 12 to the upper tier 14 and ensure the lower tier 12 and upper tier 14 remain secured to each other during shipping and high impacts or any other situation where the battery stack 10 may experience high vibration or forces.

Each of the lower tier attachment 20 and upper tier attachment 30 has mounting footprint 40 being the same for being attached to the lower tier 12 and upper tier 14 respectively. The mounting footprint 40 is defined by a plurality of fastening locations 44 such as apertures or lugs or any other suitable fastening location. This commonality between the mounting footprint 40 of the upper tier attachment 30 and lower tier attachment 20 reduces complexity in manufacturing and improves quality by eliminating the possibility of assembly errors. Reducing complexity also reduces manufacturing costs.

The fastening locations 44 are adapted to mate with fastening features 46 defining a mounting pattern 48 disposed on an array frame 50. Each of the upper and lower battery arrays is disposed in an array frame 50. Each of the array frames 50 includes a pair of top rails 52 and a pair of bottom rails 54. The top rails 52 and bottom rails 54 are connected by a pair of opposing end plates 56 to form the array frame 50 for each battery array. The top rails 52 are common in all of the array frames 50, whether the array frame 50 is for an array on the lower tier 12 or upper tier 14. Likewise, the bottom rails 54 are common in all of the array frames 50.

The common top rails 52 and common bottom rails 54 define the common mounting pattern 48. By having the top and bottom mounting pattern 48 the same for each of the lower tier 12 and upper tier 14, it allows commonality between the brackets for each of the lower tier 12 and upper tier 14. For example, the middle bracket 22 can be the same for each of the lower tier 12 and upper tier 14, or additional tiers if necessary. Likewise, the bottom tray 32 may be secured the bottom surface 34 of each of the lower tier 12 and upper tier 14. In the lower tier, the bottom tray 32 may be used to secure the stack 10 in the vehicle, for example.

This commonality of the top rails 52 and bottom rails 54 reduces complexity in manufacturing, improves quality by eliminating assembly errors, and manufacturing costs.

Figure 3:
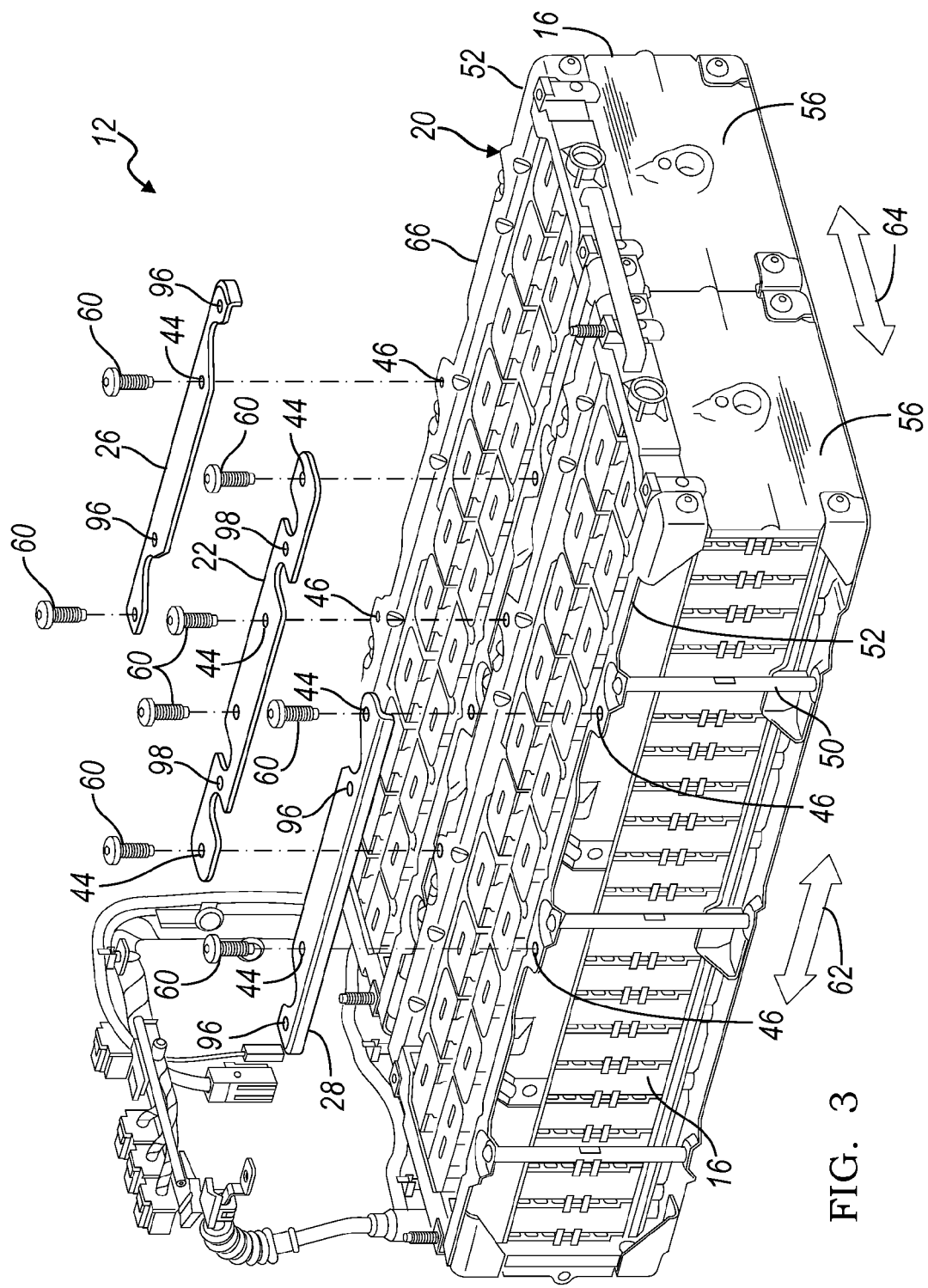
FIG. 3 illustrates a method of assembling the battery stack of FIG. 1.
Figure 4:
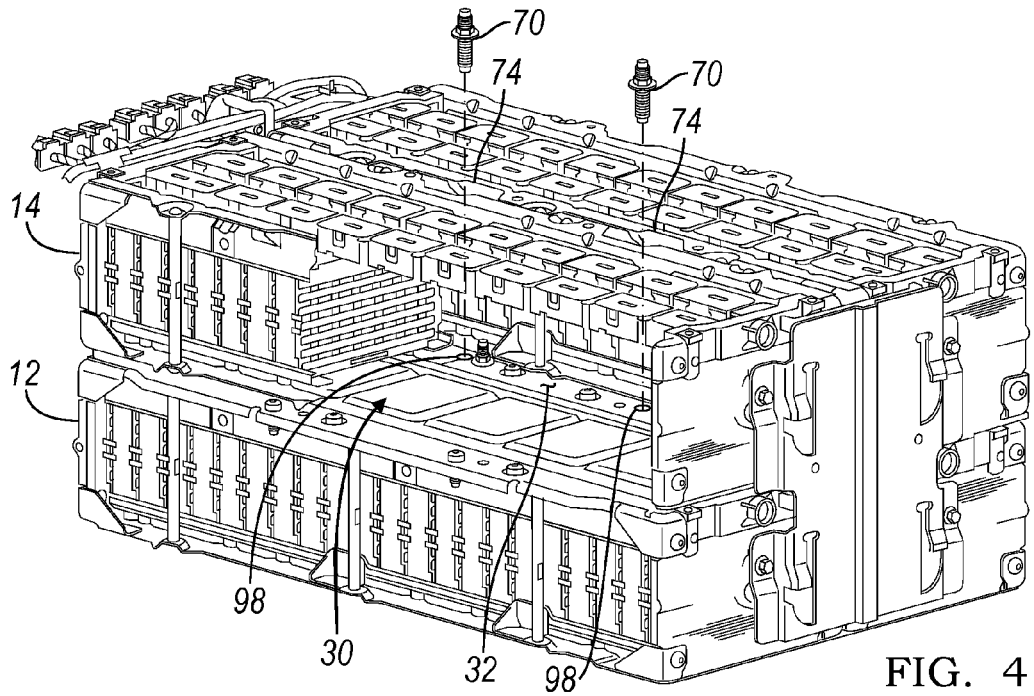
FIG. 4 illustrates a method of assembling the battery stack of FIG. 1.
Figure 5:
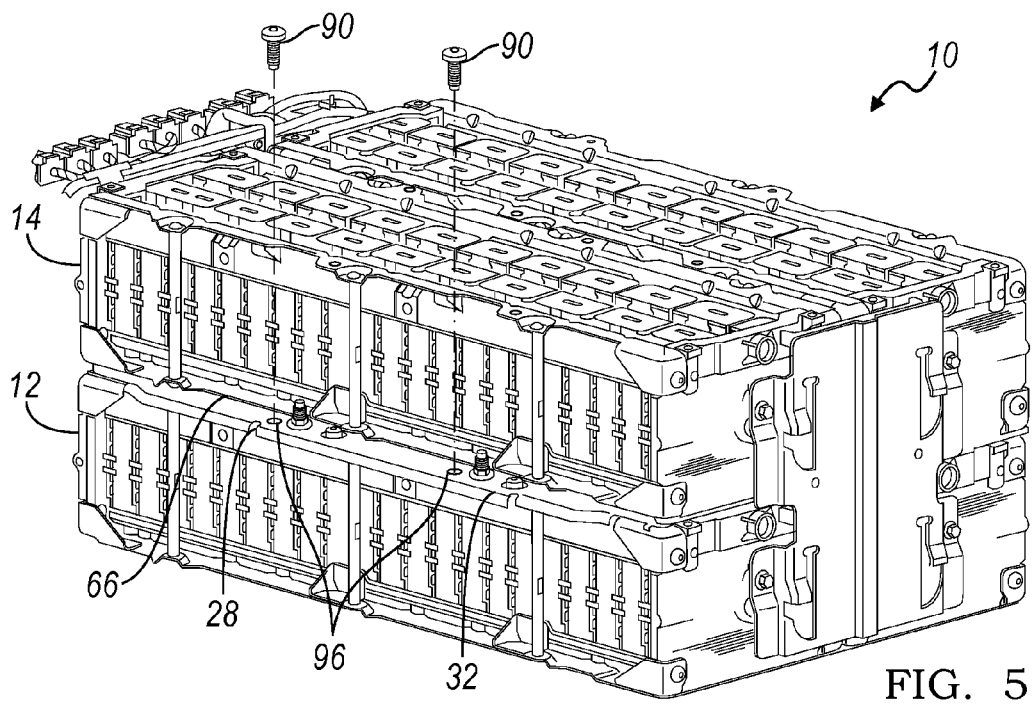
FIG. 5 illustrates a method of assembling the battery stack of FIG. 1.

FIGS. 3-5 illustrate a method of simplified assembly of the battery stack 10. As shown in FIG. 3, the array of battery cells 16 extends in a longitudinal direction 62. The pair of lower battery cell arrays 16 are positioned adjacent each other in a lateral direction 64. The lower arrays 16 are connected by the top middle bracket 22 along adjacent top rails 52 by a plurality of fasteners 60. The lower right side bracket 26 and left side bracket 28 are also connected to the top rails 52 on the lateral side regions 66 of each of the lower arrays 16. As illustrated, the fasteners 60 are bolts. However, any type of suitable fastener is contemplated, including screws, rivets, or welds, for example.

Likewise, the upper arrays of battery cells 18 extend in the longitudinal direction and are positioned adjacent each other in the lateral direction 64. The upper arrays 18 are connected by the bottom tray 32 along adjacent bottom rails 54 of the array frames by a plurality of fasteners 60.

After the defining the lower tier 12 and the upper tier 14 by connecting the lower arrays 16 and the upper arrays 18 respectively, the upper battery tier 14 is aligned with the lower battery tier 12, as shown in FIG. 4. Second stage fasteners 70 extend through the bottom rail 54 and the bottom tray 32 of the upper tier 14 and through the top middle bracket 22 to fasten the upper tier 14 to the lower tier 12.

An access opening 74 formed in the upper tier 14 allows the upper tier 14 to be fastened to the lower tier 12 without heavy and cumbersome clamps or brackets that extend around the stack. The access opening 74 extends in a vertical direction between adjacent battery arrays 18. As illustrated, the fasteners 70 are torque screws. However, any type of suitable fastener is contemplated, including bolts, rivets, or welds, for example.

Each of the lower array frames 50 includes at least one locating feature 80. Each of the upper array frames 50 includes at least one locating member 82 that mates with the locating feature 80 of a corresponding lower array frame 50. Mating the locating feature 80 to the locating member aids in aligning the upper tier 14 to the lower tier 12.

As shown in FIG. 5, the upper tier 14 is secured to the lower tier 12 along the lateral side regions 66 with a third stage of fasteners 90. The fasteners 90 extend through the bottom rail 54 and the bottom tray 32 of the upper tier 14 and through the side brackets 26, as shown on the left, to fasten the upper tier 14 to the lower tier 12. Likewise, additional fasteners 90 extend through the bottom rail 54 and the bottom tray 32 of the upper tier 14 and through the side bracket 26 on the right to fasten the upper tier 14 to the lower tier 12. As illustrated, the fasteners 90 are bolts. However, any type of suitable fastener is contemplated, including screws, rivets, or welds, for example.

Figure 6:
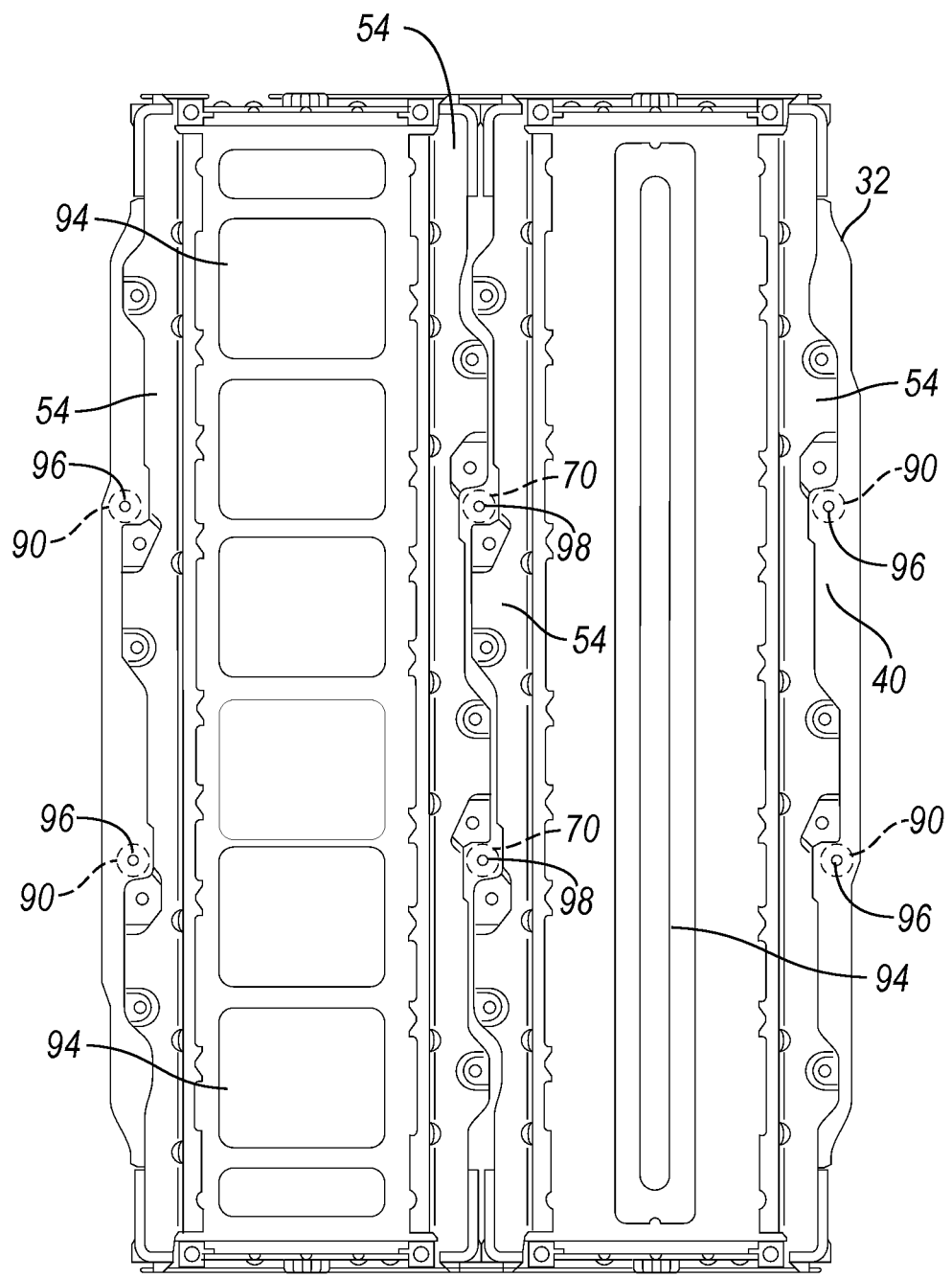
FIG. 6 illustrates a portion of the upper tier of the battery stack of FIG. 1.

FIG. 6 illustrates a section view along section 6-6 in FIG. 1 essentially showing the top view of the bottom tray 32. The bottom tray 32 includes a plurality of openings 94 so that bottom tray 32 does not restrict airflow between the lower array 16 and the upper battery array 18. For example, airflow that provides thermal management including cooling and heating, may flow from a duct connect to the air conditioning system into a battery chamber. The incoming airflow may be directed by a pusher-type fan. Airflow exiting the battery chamber may flow into an exhaust duct which may be directed outside the vehicle. The exhaust duct may include a puller-type fan to increase exhaust airflow.

FIG. 6 further illustrates the mounting footprint 40 being the same for attaching the lower tier 12 to upper tier 14. The mounting footprint 40 includes a plurality of connection locations for connecting the bottom tray 32 to the middle bracket 22, and side brackets 26. The mounting footprint 40 includes lateral connection locations 96 through which fasteners 90 extend to connect the tray 32 to the side brackets 26 to. The mounting footprint 40 also includes central connection location 98 through which fasteners 70 extend to connect the middle bracket 22 to the bottom tray 32. The connection locations may be apertures or lugs or any other suitable fastening location. As discussed previously, the central connection locations are accessible only through the access openings 74 in the upper tier 14.

As shown in FIGS. 3-5, the middle bracket 22, has corresponding central connection locations 98. Further, the side brackets 26 have corresponding lateral connection locations 96. This commonality between the upper tier attachment 30 and lower tier attachment 20 reduces complexity in manufacturing and improves quality by eliminating the possibility of assembly errors. Reducing complexity also reduces manufacturing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery stack comprising:
   lower and upper battery tiers each formed of at least two battery cell arrays;
   a plurality of array frames each housing one of the battery arrays;
   a lower bracket connecting the lower arrays along a top surface of the lower tier;
   an upper bracket connecting the upper arrays along a bottom surface of the upper tier; and
   a plurality of fasteners each extending only through connection locations on the upper bracket and the lower bracket to connect the upper battery tier to the lower battery tier wherein the fasteners do not extend through any of the array frames,
   wherein the lower and upper battery tiers are secured together by the brackets without the plurality of fasteners mounted to an exterior surface of the stack.

2. The battery stack of claim 1 wherein each of the brackets has a same mounting footprint and wherein the footprints are aligned to secure the lower and upper tiers together, and allow airflow between the lower and upper battery tiers.

3. The battery stack of claim 1 wherein the lower bracket comprises a top middle bracket and a pair of side brackets, wherein the top middle bracket connects the at least two lower battery arrays, and wherein the side brackets are spaced apart from the middle bracket and mounted to side regions on the lower battery tiers.

4. The battery stack of claim 3 wherein the top middle bracket and the pair of side brackets are spaced apart to define lower openings, wherein the upper bracket includes a plurality of apertures formed therethrough, and wherein the lower openings and plurality of apertures allow airflow between the lower and upper battery tiers.

5. The battery stack of claim 3 wherein the lower bracket is fastened to a top surface of the lower battery tier and the upper bracket is fastened to a bottom surface of the upper battery tier, wherein the mounting footprint of the lower bracket and upper bracket is the same, and wherein each mounting footprint includes a plurality of connection locations that align to connect the lower and upper battery tiers.

6. The battery stack of claim 1, wherein each of the array frames includes a pair of top rails and a pair of bottom rails and wherein the top and bottom rails are connected by a pair of opposing end plates.

7. The battery stack of claim 6 wherein the lower arrays are connected by the top middle bracket along adjacent top rails of the array frames and wherein the upper arrays are connected by a tray along adjacent bottom rails of the array frames.

8. The battery stack of claim 6 wherein each of the lower array frames includes at least one locating feature and each of the upper array frames includes at least one locating member that cooperates with the locating feature of a corresponding lower array frame to align the upper and lower battery tiers.

9. The battery stack of claim 6 wherein the lower battery arrays are connected by the middle bracket along adjacent top rails of the array frames.

10. The battery stack of claim 1 wherein the upper battery arrays are connected by a tray along adjacent bottom rails of the array frames.

11. The battery stack of claim 1 wherein an access opening is defined in the upper battery tier such that a fastener is accessible through the access opening to fasten the upper and lower brackets.

12. A battery stack comprising:
a lower battery tier having at least two lower arrays of battery cells connected together;
a top middle bracket connecting the two arrays and mounted to a top surface of the lower tier;
a pair of side brackets mounted along opposite side regions of the lower tier on the top surface of the lower tier;
an upper battery tier having at least two upper arrays of battery cells connected together; and
a bottom tray connecting the two upper arrays and mounted to a bottom surface of the upper tier,
wherein the bottom tray is aligned and fastened together with the top middle bracket and the pair of side brackets when the upper battery tier is mounted to the lower battery tier, thereby securing and aligning the lower and upper tiers together, and
wherein the brackets and bottom tray allow an airflow between the lower and upper battery arrays when the lower and upper battery tiers are secured together;
a plurality of fasteners, wherein an upper mounting footprint is defined by the bottom tray and a lower mounting footprint is defined by the top middle bracket and the side brackets, wherein the upper mounting footprint and lower mounting footprint are the same, wherein each mounting footprint includes a plurality of connecting locations that align to connect the lower and upper battery tiers, and wherein at least one of the fasteners extends through a connecting location defined in the top middle bracket and the bottom tray to secure the lower and upper battery tiers together;
a plurality of array frames each housing one of the arrays, wherein each of the array frames includes a pair of top rails and a pair of bottom rails, wherein the top and bottom rails are connected by a pair of opposing end plates, wherein the lower arrays are connected by the top middle bracket along adjacent top rails of the array frames and the upper arrays are connected by the bottom tray along adjacent bottom rails of the array frames, and wherein the plurality of fasteners extend only through the connection locations on the upper bracket and the lower bracket to connect the upper battery tier to the lower battery tier such that the fasteners do not extend through any of the array frames.

13. The battery stack of claim 12 wherein an access opening is defined in the upper battery tier such that the connection location is accessible through the access opening to fasten the bottom tray and the top middle bracket together.

* * * * *